US012689323B2

(12) United States Patent
Banerjee

(10) Patent No.: US 12,689,323 B2
(45) Date of Patent: Jul. 21, 2026

(54) DUAL AXIS SOLAR TRACKING SYSTEM

(71) Applicant: Shilowbhadra Banerjee, Pune (IN)

(72) Inventor: Shilowbhadra Banerjee, Pune (IN)

(*) Notice: Subject to any disclaimer, the term of this patent is extended or adjusted under 35 U.S.C. 154(b) by 334 days.

(21) Appl. No.: 18/551,893

(22) PCT Filed: Feb. 17, 2022

(86) PCT No.: PCT/IB2022/051401
§ 371 (c)(1),
(2) Date: Sep. 22, 2023

(87) PCT Pub. No.: WO2022/175853
PCT Pub. Date: Aug. 25, 2022

(65) Prior Publication Data
US 2024/0339956 A1      Oct. 10, 2024

(30) Foreign Application Priority Data
Feb. 19, 2021    (IN) .............................. 202121007012

(51) Int. Cl.
*H02S 20/32*        (2014.01)
(52) U.S. Cl.
CPC ................................... *H02S 20/32* (2014.12)
(58) Field of Classification Search
CPC ................................ H02S 20/32; F24S 25/12
See application file for complete search history.

(56) References Cited

U.S. PATENT DOCUMENTS 6,443,145 B1    9/2002  Buron et al.
9,660,122 B2    5/2017  Tan 2008/0168981 A1     7/2008  Cummings et al.
2009/0314280 A1    12/2009  Banerjee
2013/0118099 A1*    5/2013  Scanlon ................ F24S 25/636
                                                          136/246
2018/0254739 A1*    9/2018  Luo .......................... F24S 30/48
2020/0195191 A1*    6/2020  Melton .................... H02S 20/32

FOREIGN PATENT DOCUMENTS

CN        103780199 B   *   4/2016   ............. F24S 30/20
CN        106253820 A   *  12/2016   ............. F24S 30/20
CN        107070384 A   *   8/2017   ............. H02S 20/32
CN        107302340 A   *  10/2017   ............. H02S 20/32
CN        110492838 A   *  11/2019   ............. H02S 20/32

OTHER PUBLICATIONS

English machine translation of CN 107302340A (Year: 2017).*

* cited by examiner

*Primary Examiner* — Kourtney R S Carlson

(57) ABSTRACT

A dual axis solar tracking system. The dual axis solar tracking system (100) comprises a base frame comprising a vertical pole (106) that extend from the ground and a longitudinal structure (104) that extends laterally from the vertical pole (106). A first panel assembly (102a) and a second panel assembly (102b) are coupled to the longitudinal structure (104), wherein the first panel assembly (102a) comprises a first solar panel and the second panel assembly (102b) comprises a second solar panel. The first solar panel is configured to track diurnal solar motion by tilting about a first daily tilt axis (402) and the second solar panel is configured to track diurnal solar motion by tilting about a second daily tilt axis (612b). The first daily tilt axis (402) and the second daily tilt axis (612b) are parallel to each other and spaced apart.

11 Claims, 15 Drawing Sheets

DUAL AXIS SOLAR TRACKING SYSTEM

BACKGROUND

Unless otherwise indicated herein, the materials described in this section are not prior art to the claims in this application and are not admitted to being prior art by inclusion in this section.

FIELD OF INVENTION

The subject matter in general relates to solar tracking systems. More particularly, but not exclusively, the subject matter relates to a dual axis solar tracking system to track both diurnal solar motion and seasonal solar motion.

DISCUSSION OF RELATED ART

Solar tracking system have been introduced in the field to improve the output efficiency of solar photovoltaic panels. Solar installations with tracking systems increase energy output by an average of 15% to 35% compared to fixed panel solar installations. The output efficiency depends on the manner of tracking. Of the many different tracking configurations, single axis tracking from sunrise to sunset accounts for the bulk of the gain in output, ranging from 15% to 25%. Dual axis tracking can account for an additional gain of up to 10% when compared to a panel with fixed tilt.

However, solar tracking entails additional costs due to the additional hardware setup required. For a tracker to be viable, the added setup cost should be more than compensated by the economic gain provided by higher panel output during operation. Dual axis trackers typically have an added setup cost with respect to single axis trackers, but with a much smaller additional gain (up to 10%) in energy output.

Furthermore, mono-facial planar photovoltaic (PV) cells, typically used in currently available systems, are able to harvest sunlight incident on just one side (the "front" side) of each cell. Just as a tracking system improves energy gain over that of a non-tracking system, the use of bifacial panels and their optimization may also offer a similar significant boost in energy output that is not fully exploited in currently available systems. Although bifacial cells are somewhat more expensive today than mono-facial cells, their cost can be mitigated by their higher energy output especially if the system is optimized. Furthermore, it is expected that greater adoption and higher volume manufacturing will lower costs.

In addition to the foregoing, in the available conventional dual axis trackers, namely alt-azimuth, tip-tilt and polar trackers, complex coordinate transformations are required to map the movement of the sun to the angular displacements around the tracking axes of the tracking system. These angular displacements are non-uniform through time. The tracking motion in equatorial trackers on the other hand, is more regular and uniform. But practical implementation of equatorial solar trackers are not found in the commercial domain due to their complexity.

In view of the foregoing, there is a need for improved equatorial tracking systems, that can be optimized for bifacial cells and also aim at reducing manufacturing, installation and operational costs to a level comparable to that of single axis trackers, while maintaining their intrinsic advantages of higher power output per panel.

SUMMARY

In one aspect a dual axis solar tracking system is provided. The system comprises a base frame comprising a vertical pole that extends from the ground and a longitudinal structure extending laterally from the vertical pole. A first panel assembly is coupled to the longitudinal structure, wherein the first panel assembly comprises a first solar panel. Similarly, a second panel assembly is coupled to the longitudinal structure, wherein the second panel assembly comprises a second solar panel. The first solar panel and the second solar panel are configured to track diurnal solar motion by tilting about a first daily tilt axis and second daily tilt axis, respectively. The first daily tilt axis and the second daily tilt axis are parallel to each other and are spaced apart.

The first solar panel and the second solar panel are configured to track seasonal solar motion by tilting about a first seasonal tilt axis and a second seasonal tilt axis, respectively. The first seasonal tilt axis and the second seasonal tilt axis are parallel to each other and are spaced apart.

The system comprises a tracking system coupled with the first panel assembly to enable diurnal solar motion tracking. A pair of daily tilt transfer wire ropes connect the first panel assembly and the second panel assembly. The wire ropes are configured to transfer the tilt occurring about the first daily tilt axis to the second panel assembly to tilt the second panel assembly about the second daily tilt axis.

The system comprises a seasonal tilt wire assembly connecting the first panel assembly and the second panel assembly configured to tilt the first panel assembly and the second panel assembly about first seasonal tilt axis and second seasonal tilt axis, respectively.

BRIEF DESCRIPTION OF DRAWINGS

This disclosure is illustrated by way of example and not limitation in the accompanying figures. Elements illustrated in the figures are not necessarily drawn to scale, in which like references indicate similar elements and in which.

3

Figure 8A:
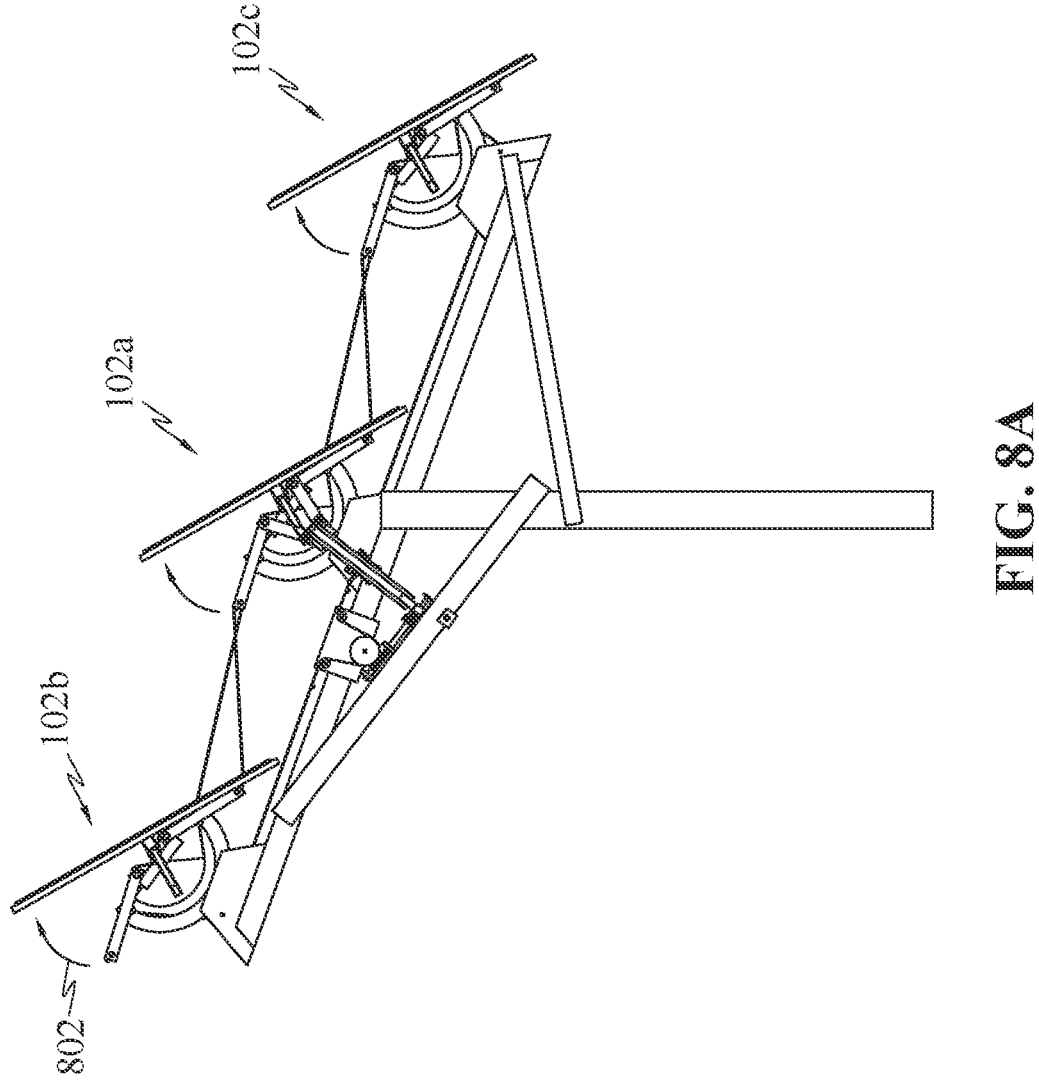
Figure 8B:
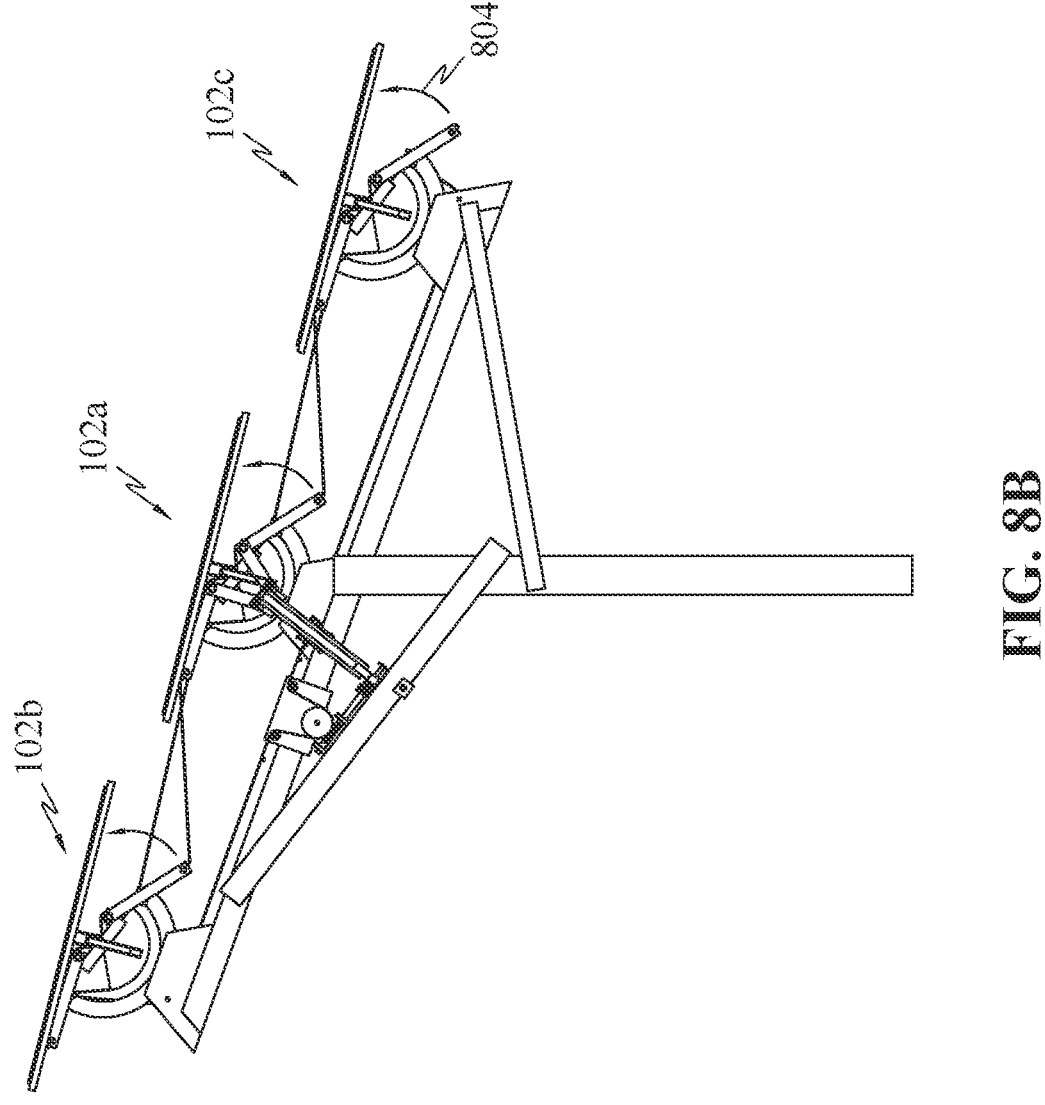

FIG. 8A illustrates solar panels tilted in first direction 802, in accordance with an embodiment; and FIG. 8B illustrates solar panels tilted in second direction 804, in accordance with an embodiment.

DETAILED DESCRIPTION OF THE INVENTION

The following detailed description includes references to the accompanying drawings, which form part of the detailed description. The drawings show illustrations in accordance with example embodiments. These example embodiments are described in enough details to enable those skilled in the art to practice the present subject matter. However, it will be apparent to one of ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "A or B" includes "A but not B," "B but not A," and "A and B," unless otherwise indicated.

Figure 1:
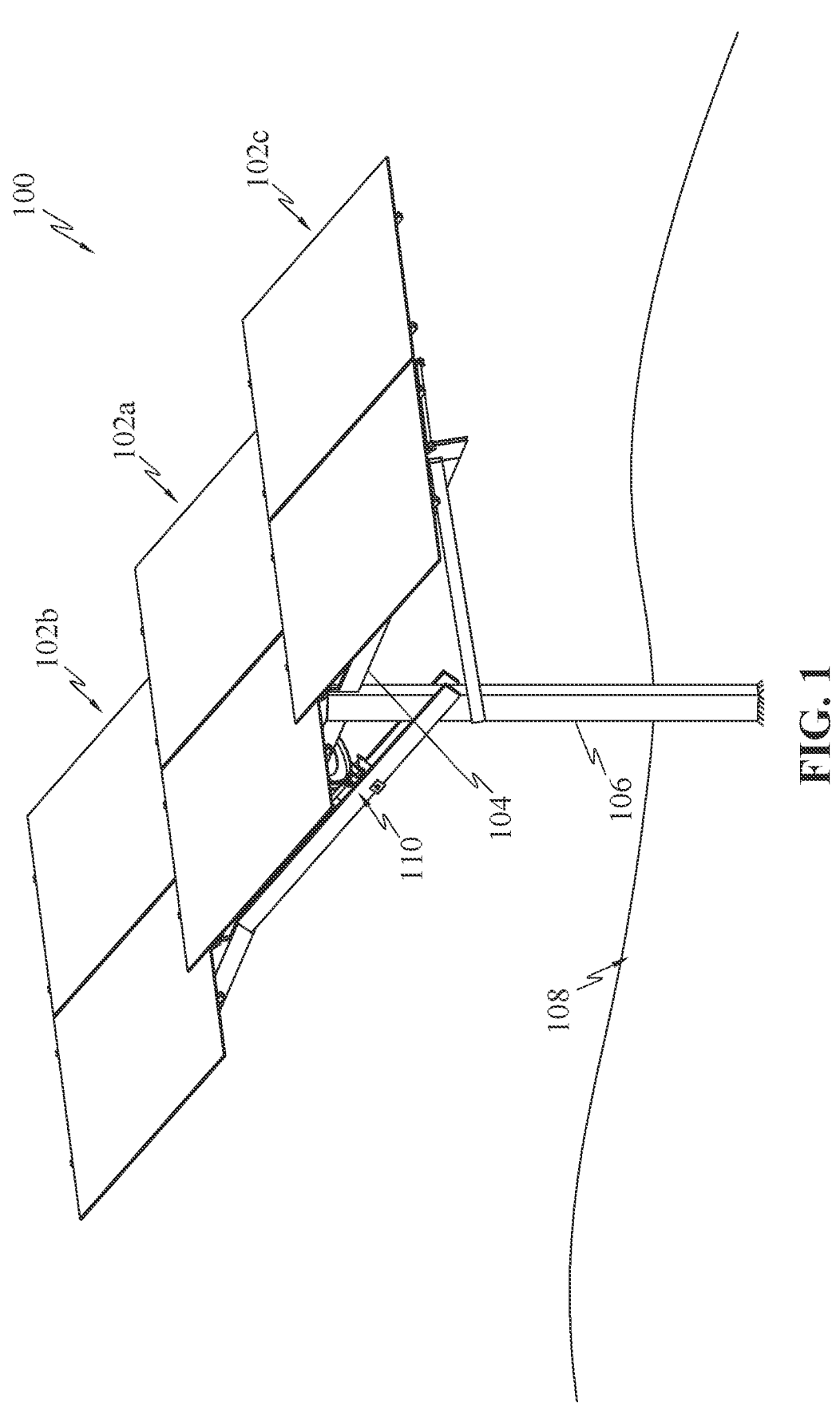
FIG. 1 illustrates a dual axis solar tracking system 100, in accordance with an embodiment.

Referring to FIG. 1, an exemplary diagram of a dual axis solar tracking system 100 is disclosed, in accordance with an embodiment. The system 100 comprises a plurality of panel assemblies 102*a*, 102*b*, 102*c* that may be coupled to a longitudinal structure 104. The longitudinal structure 104 may extend laterally from a vertical pole 106, wherein the vertical pole 106 may extend from the ground 108. The longitudinal structure 104 may be coupled to the vertical pole 106 at a pivot point 312 (refer FIG. 3) such that the longitudinal structure 104 may be tilted about the pivot axis 314 during setting up of the system 100.

In an alternate embodiment, the solar tracking system may comprise multiple vertical poles that may support an extended longitudinal structure that may be configured to support a greater number of solar panel assemblies.

The system 100 comprises a tracking system 110 that may be configured to tilt solar panel assemblies 102 to track diurnal solar motion. The tracking system 110 may also be configured to tilt the solar panel assemblies 102 to track seasonal solar motion.

Figure 2A:
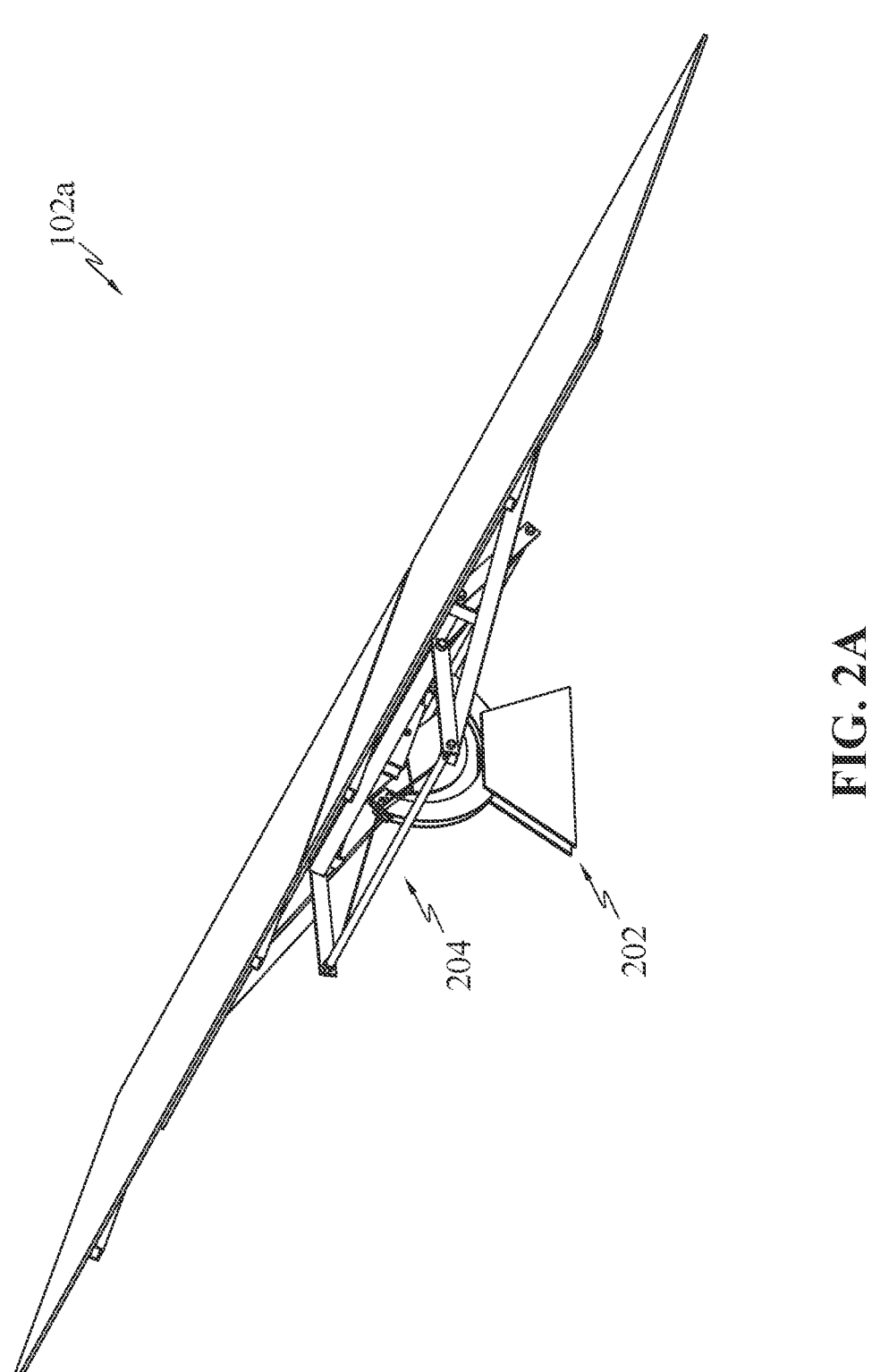
FIG. 2A illustrates a single panel assembly 102, in accordance with an embodiment.
Figure 2B:
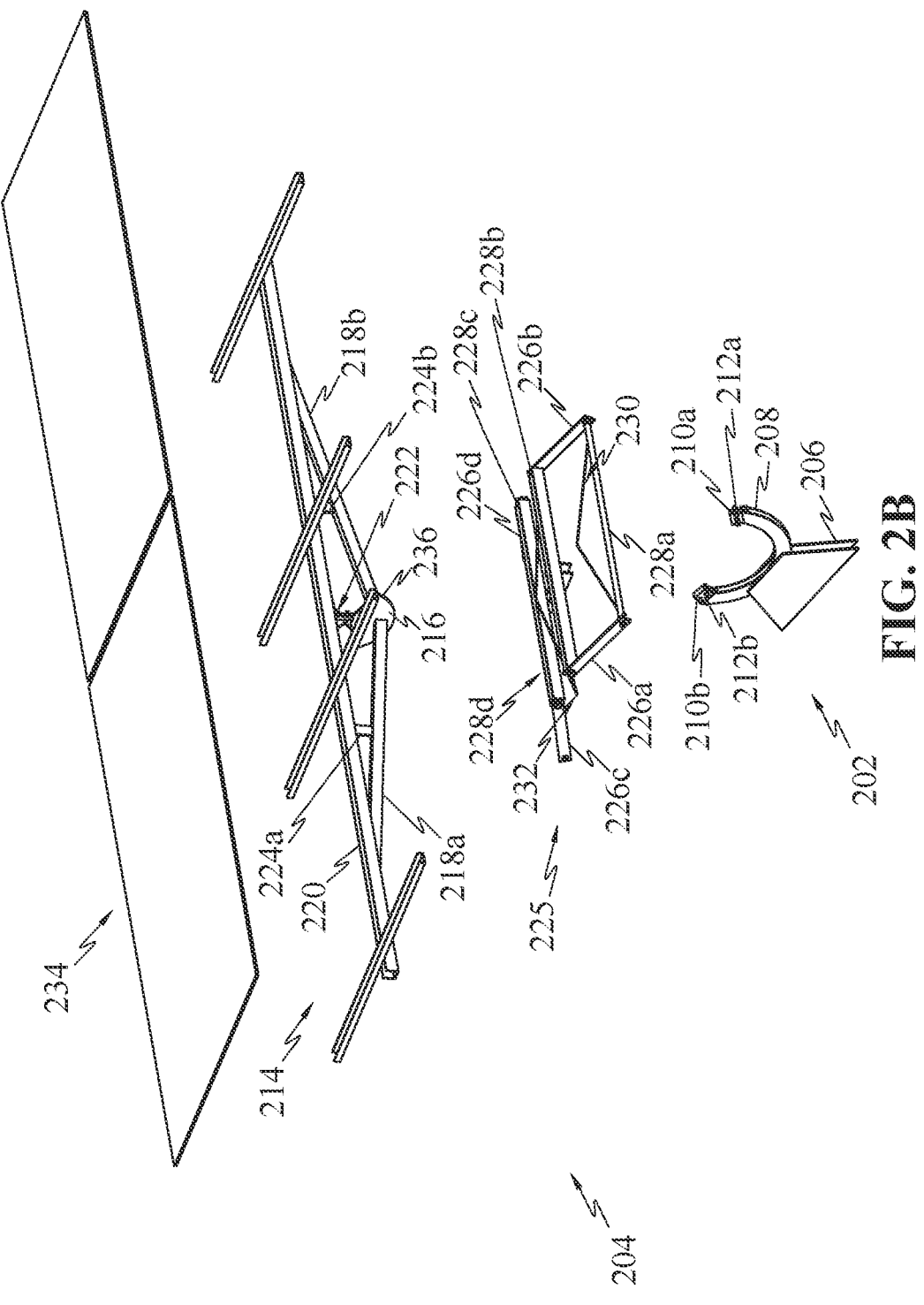
FIG. 2B illustrates an exploded view of the single panel assembly 102, in accordance with an embodiment.

Referring to FIGS. 2A and 2B, a first panel assembly 102*a* among the plurality of panel assemblies 102 is illustrated, in accordance with an embodiment. The first panel assembly 102*a* comprises a first structure 202 and a second structure 204. The first structure 202 comprises a coupling structure 206 that may be rigidly coupled to the longitudinal structure 104. A semi-circular support 208 may be provided that may be engaged to the coupling structure 206. The semi-circular support 208 may be rigidly or removably engaged to the coupling structure 206. The semi-circular support 208 may be provided with extension members 210*a*, 210*b* towards its ends, wherein the extension members 210*a*, 210*b* may be provided with at least one passive pulley 212.

Figure 2C:
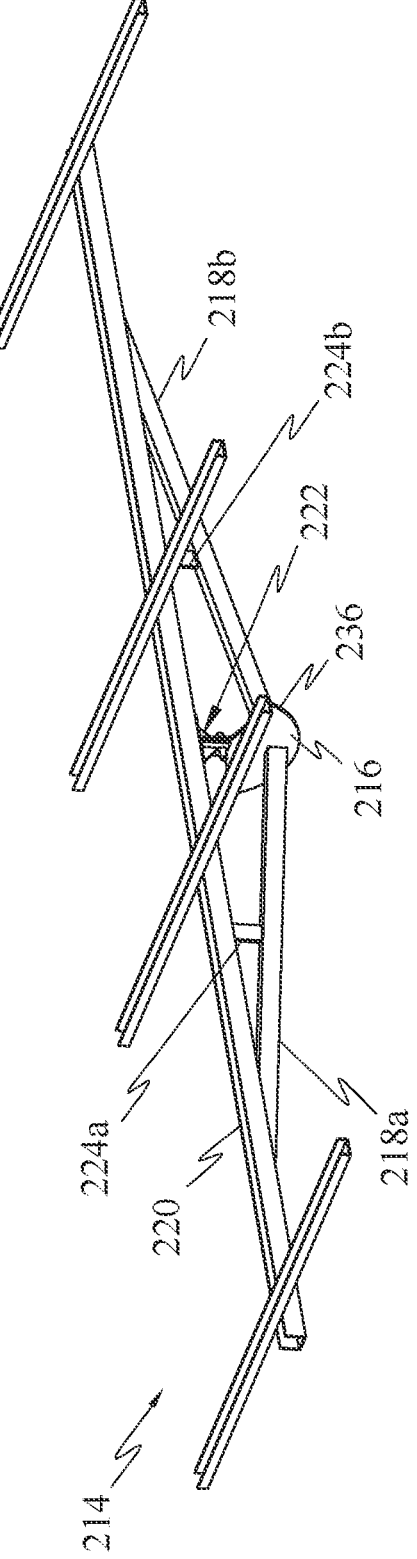
FIG. 2C illustrates a perspective view of a solar panel frame 214, in accordance with an embodiment.

Referring to FIG. 2C, the second structure 204 of the first panel assembly 102*a* comprises a solar panel frame 214 comprising a semi-circular wedge member 216 and a pair of supporting structures 218*a*, 218*b*. The solar panel frame 214 comprises a longitudinal structure 220 that may be configured to receive at least one solar panel 234. A T-structure 222 may be provided that may be rigidly or removably engaged to the longitudinal structure 220. A semi-circular wedge 216 member may in turn be coupled to the T-structure 222 such that the longitudinal structure 220, the T-structure 222, and the semi-circular wedge 216 member are engaged. The pair of supporting structures 218*a*, 218*b* may be provided on opposite sides of the semi-circular wedge member 216 such that the pair of supporting structures 218*a*, 218*b* extend from the semi-circular wedge member 216 to the longitudinal structure 220. The pair of supporting structures 218*a*, 218*b* allow load to be distributed evenly along the longitudinal structure 220 and thus avoid load and stress concentration. The second structure 204 comprises struts 224*a*, 224*b* provided between the pair of supporting structures 218*a*, 218*b* and the longitudinal structure 220. The pair of supporting structures 218*a*, 218*b* and the struts 224*a*, 224*b* provide additional rigidity and stability to the panel assembly 102*a*.

Figure 2D:
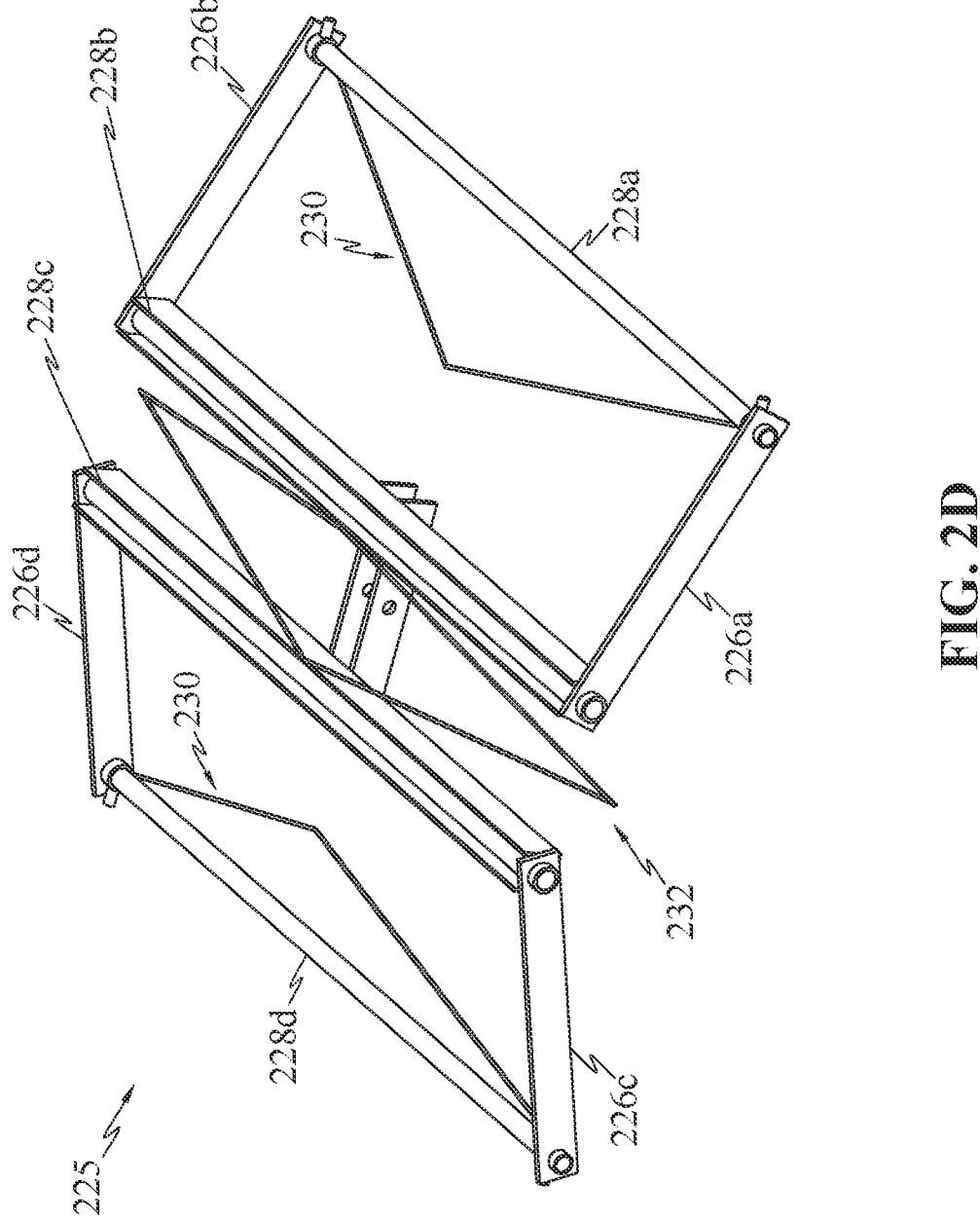
FIG. 2D illustrates a perspective view of a diurnal tilt assembly 225, in accordance with an embodiment.

Referring to FIG. 2D, the second structure 204 comprises a diurnal tilt assembly 225, wherein the diurnal tilt assembly 225 comprises a plurality of arms 226*a*, 226*b*, 226*c*, 226*d* and connecting wires 230, 232. A pair of arms 226*a*, 226*b* and 226*c*, 226*d* may be connected laterally via respective lateral connecting members 228*a*, 228*b* and 228*c*, 228*d* wherein each pair of arms 226*a*, 226*b* and 226*c*, 226*d* may be disposed on opposite sides towards the ends of the semi-circular support 208. The solar panel frame 214 may be suspended from the diurnal tilt assembly 225 by means of the connecting wires 232 and the diurnal tilt assembly 225 may be suspended on the semi-circular support 208. One end of the connecting wires 232 may be attached to the lateral connecting members 228*b*, 228*c* connecting the pair of arms 226*a*, 226*b*, 226*c*, 226*d*. The other end of the connecting wires 232 may be attached to the struts 224*a*, 224*b* (refer FIG. 2C) provided between the pair of supporting structures 218*a*, 218*b* and the longitudinal structure 220. Additionally, the T-structure 222 of solar panel frame 214 may pivot on and be guided or stabilized by bearing surfaces such as the holes 240 in the connecting members 238. The connecting wires 230 may be configured to be engaged to the distal end of the pair of arms 226*a*, 226*b* and 226*c*, 226*d* and the extension members 210*a*, 210*b* provided towards the ends of the semi-circular support 208. The connecting wires 230 may be configured to induce opposing tensions such that the panel assemblies always maintain a stable axis of diurnal rotation at any given tilt position of the second structure 204. The connecting wires 232 may be configured to induce opposing tensions such that the panel assemblies always maintain a stable axis of seasonal rotation at any given tilt position of the second structure 204.

In yet another embodiment, a diurnal tilt assembly may be provided with a torsion tube that may be employed to laterally connect a pair of arms. The torsion tube may be configured to act as an energy absorber or a damper. Wire ropes may be configured to connect two adjacent diurnal tilt assemblies by connecting the wire ropes to the torsion tubes of the two diurnal tilt assemblies.

Figure 3:
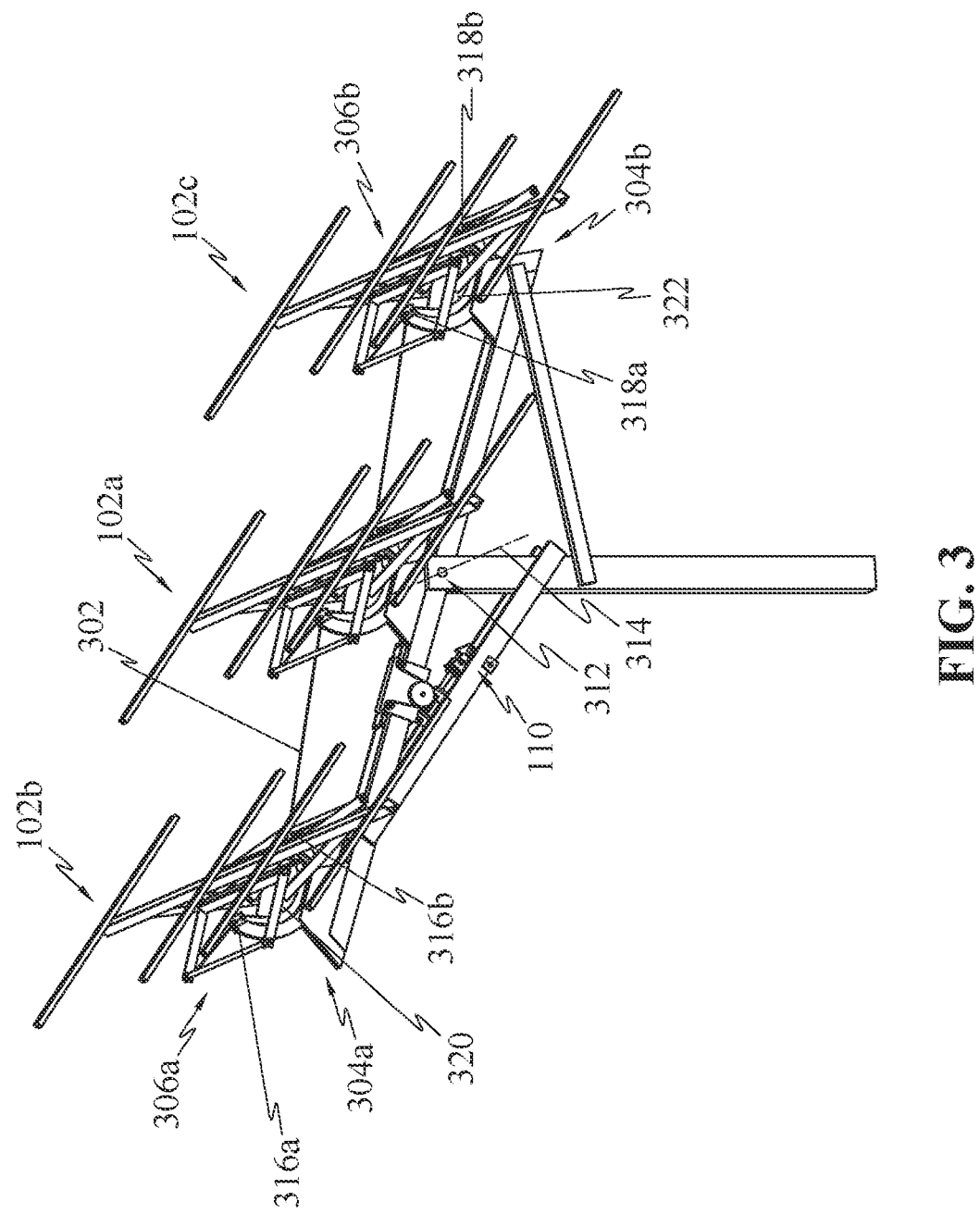
FIG. 3 illustrates the system 100 without the solar panels, in accordance with an embodiment.

In an embodiment, the semi-circular wedge member 216 comprises an interfacing face 236 that may be configured to interface with wire rope 302 (shown in FIG. 3). The surface of the interfacing face 236 may be knurled or may be provided with teeth such that the surface may grip the wire rope 302 thereby lowering the chances of slippage of the wire rope 302.

In an embodiment, the wire rope 302 may be configured to pass through the passive pulleys 212*a*, 212*b* provided in the extension members 210a, 210b. The interfacing surface 236 of the semi-circular wedge member 216 may be configured to interface with the wire rope 302 such that the wire rope 302 passes through the passive pulleys 212a, 212b and is configured to drive the semi-circular wedge member 216 along a direction of movement of the wire rope 302. The tension in the wire rope 302 may be adjusted to maintain required friction between the wire rope 302 and the semi-circular wedge member 216.

In an embodiment, the wire rope 302 may be provided with teeth on a surface that interfaces with the interfacing surface 236 of the semi-circular wedge member 216. The teeth on the wire rope 302 may offer better grip that may be required to transfer movements between the interfacing parts.

FIG. 3 illustrates a plurality of panel assemblies, i.e. first panel assembly 102a, second panel assembly 102b, and third panel assembly 102c, without solar panels, disposed along length of the longitudinal structure 104 that extends laterally from the vertical pole 106, in accordance with an embodiment. The construction of the second panel assembly 102b comprising of first structure 304a and second structure 306a, and the third panel assembly 102c comprising of first structure 304b and second structure 306b may be similar to the first panel assembly 102a comprising of first structure 202 and second structure 204. The first structures 304a, 304b of the second panel assembly 102b and the third panel assembly 102c may be rigidly or detachably coupled to the longitudinal structure 104. The solar panel frames of the second structures 306a, 306b of the respective second panel assembly 102b and the third panel assembly 102c may be configured to be suspended from the respective diurnal tilt assemblies. The diurnal tilt assemblies may be suspended from the respective first structures 304a, 304b.

Figure 4A:
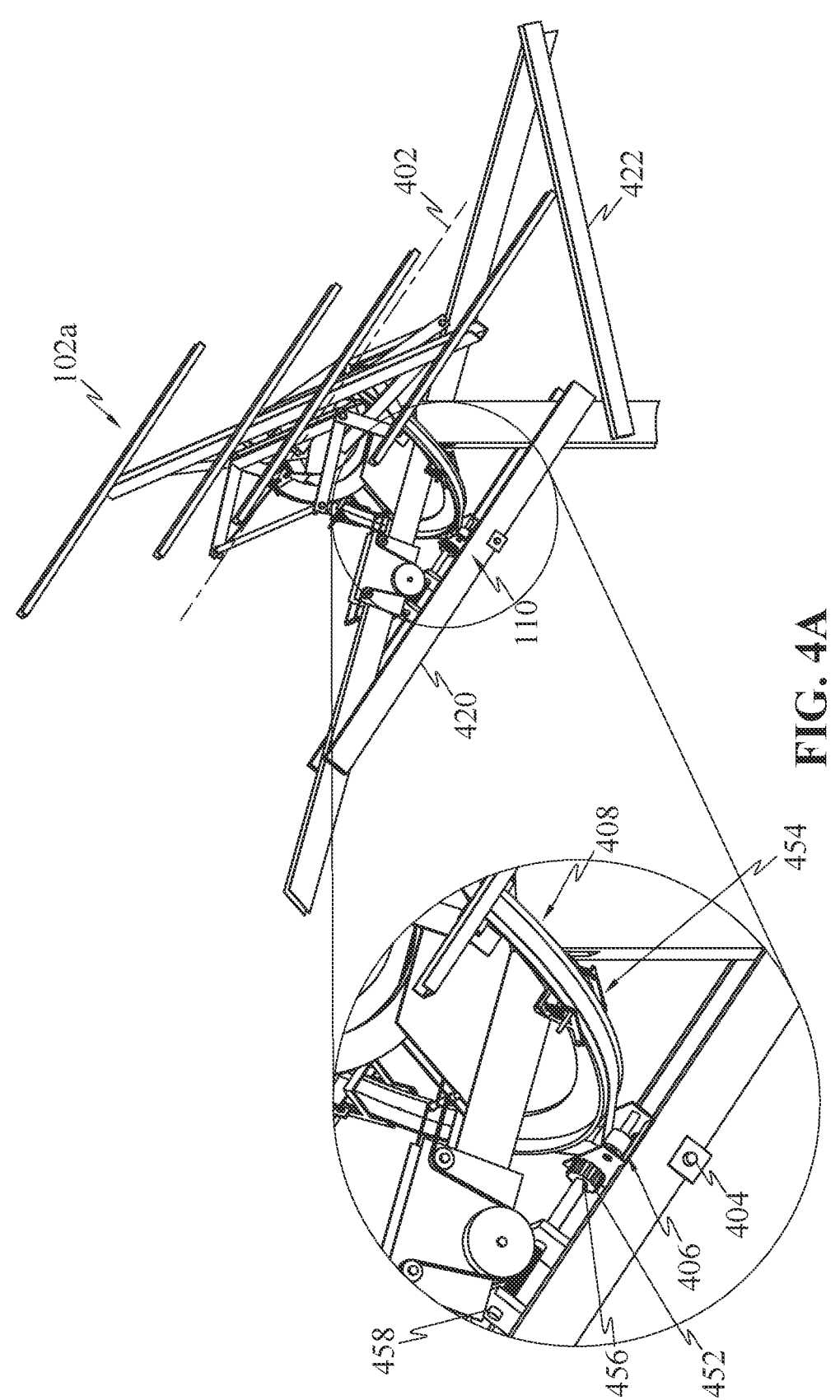
FIG. 4A illustrates a detailed view of a tracking system 110, in accordance with an embodiment.
Figure 4B:
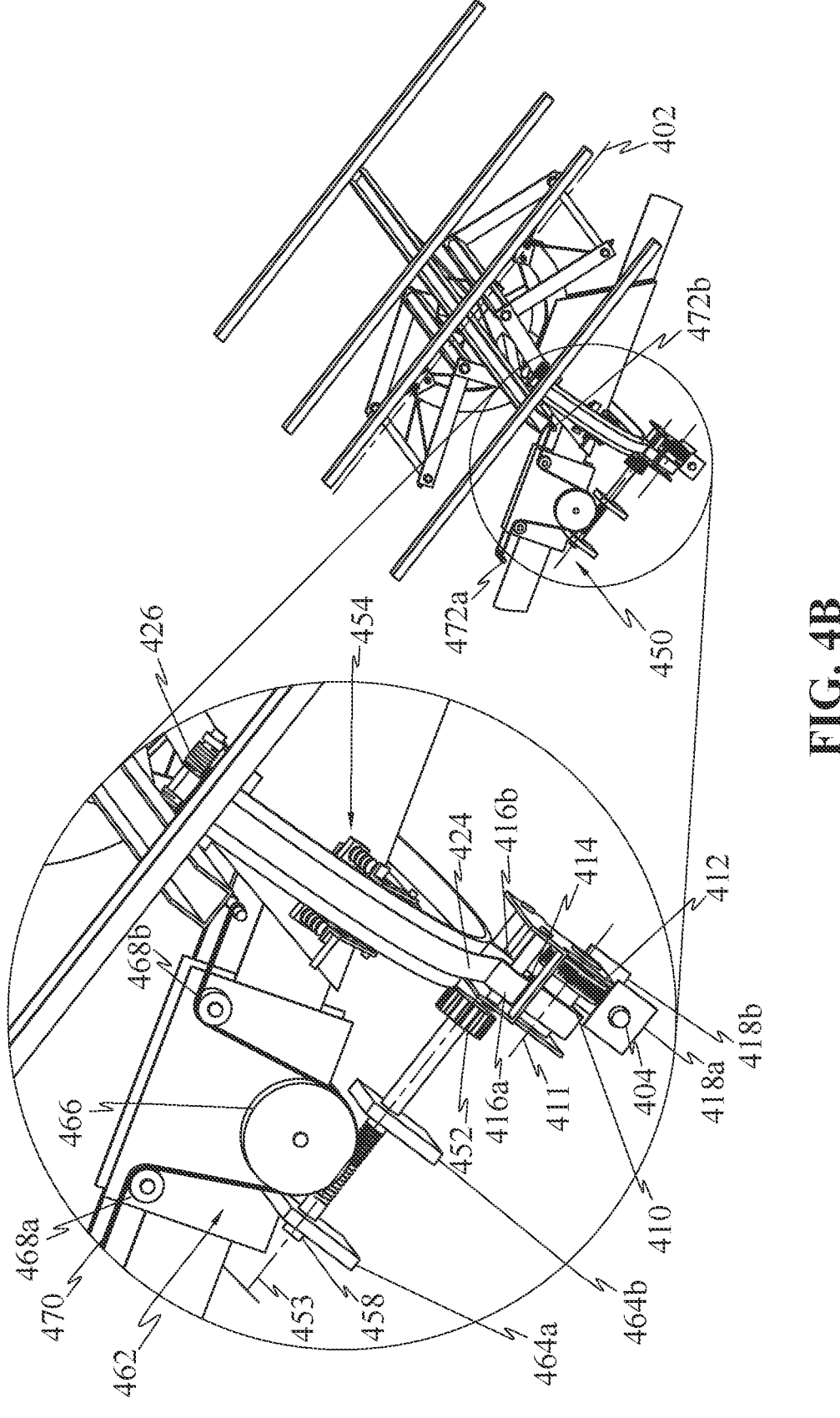
FIG. 4B illustrates another detailed view of the tracking system 110, in accordance with an embodiment.
Figure 4C:
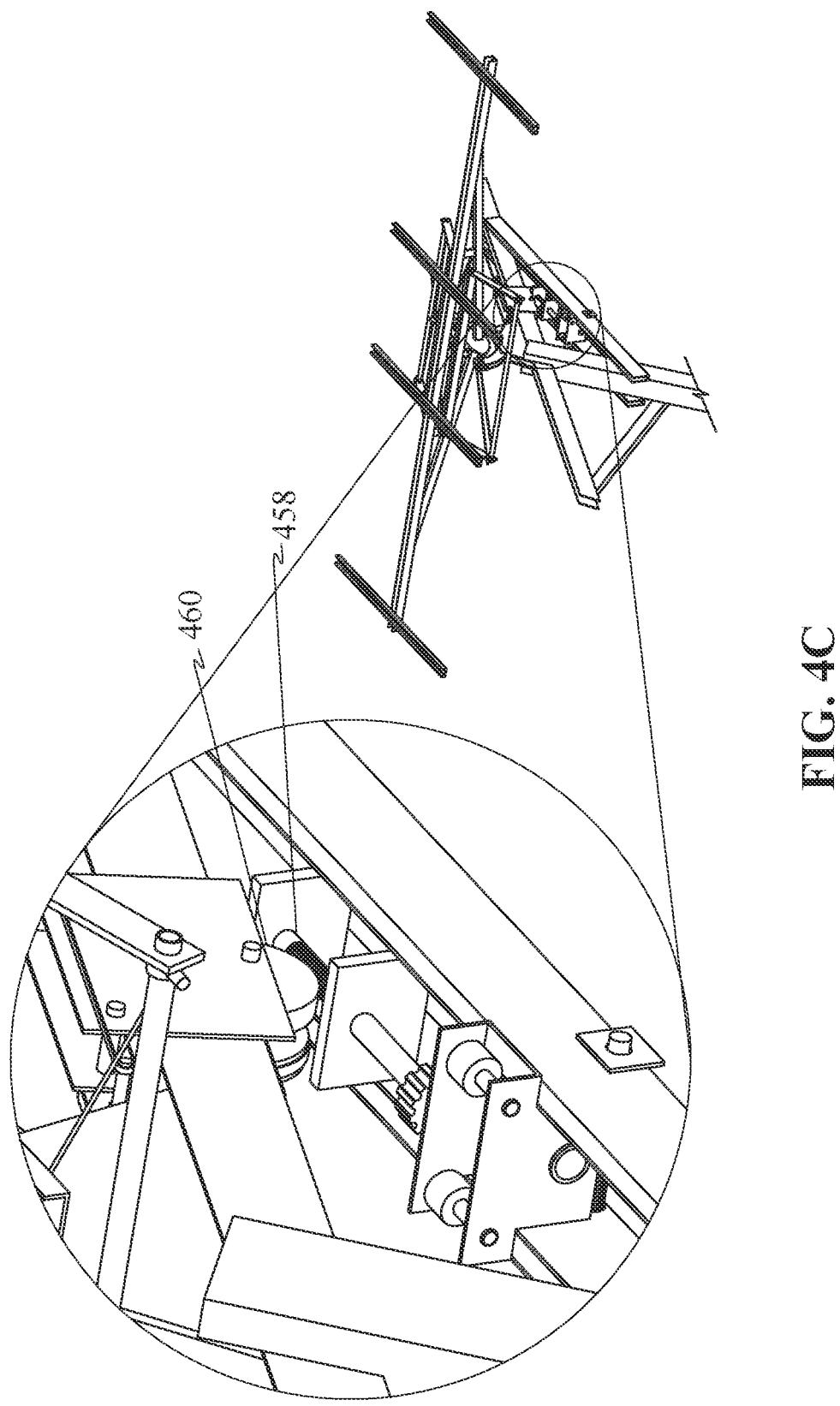
FIG. 4C illustrates another detailed view of the tracking system 110, in accordance with an embodiment.

FIGS. 4A, 4B and 4C illustrate tracking system 110, in accordance with an embodiment. The tracking system 110 may be coupled with the first panel assembly 102a. The tracking system 110 may be configured to tilt the first panel assembly 102a about a first daily tilt axis 402 enabling tracking of diurnal solar motion.

In an embodiment, the tracking system 110 comprises a motor (not shown in figures), a motor shaft 404, a first pulley assembly 406 and a semi-circular frame 408 that may be configured to track diurnal solar motion. The motor shaft 404 may be coupled to the motor, wherein the motor shaft 404 may define external threads. The motor shaft 404 may act as a worm drive. A second shaft 410 may be positioned perpendicular over the motor shaft 404. A worm gear 412 may be provided on the second shaft 410. The worm gear 412 may be coupled with the motor shaft 404 such that teeth on the motor shaft 404 engage with the teeth on the worm gear 412. The worm gear 412 setup enables transfer of rotary motion from axis of the motor shaft 404 to axis of the second shaft 410.

The first pulley assembly 406 comprises a driving pulley 414 mounted on the second shaft 410, such that rotation of the worm gear 412 rotates the driving pulley 414. The driving pulley 414 may be co-axial to the worm gear 412. Two passive pulleys 416a, 416b may be disposed symmetrically on opposite sides of the driving pulley 414. The worm gear 412 along with the first pulley assembly 406 may be supported by two pillow blocks 418a, 418b rigidly engaged to support column 420. The support column 420 may be rigidly engaged to the longitudinal structure 104 and the vertical pole 106. Another supporting column 422 may be provided on opposite side of the support column 420 that may be engaged to the vertical pole 106 and the longitudinal structure 104.

In an alternate embodiment, vertical pole may be provided with plurality of holes along its length. Supporting columns may be provided with at least one hole such that the holes on the longitudinal structure and the supporting columns may be aligned to adjust initial orientation of the longitudinal structure extending laterally from the vertical structure.

In an embodiment, the semi-circular frame 408 provided may be rigidly or detachably connected to the first panel assembly 102a by any known means in the industry. A belt 424 may be provided, wherein ends of the belt 424 may be engaged to ends of the semi-circular frame 408. One surface of the belt 424 may be configured to interface with an outer interfacing surface of the semi-circular frame 408.

In an embodiment, the surface of the belt 424 interfacing with the outer interfacing surface of the semi-circular frame 408 may grip on to semi-circular frame 408.

In an alternate embodiment, surface of belt interfacing and surface of outer interfacing surface of semi-circular frame may define teeth that may allow a better grip between the interfacing components thereby preventing slippage of the belt 424 from the semi-circular frame.

In yet another embodiment, semi-circular frame may be provided with a rim at its edges that may be configured to receive a belt that maybe engaged to ends of the semi-circular frame, thereby preventing the belt from slipping out from the desired position.

In an embodiment, the belt 424 interfacing with the semi-circular frame 408 may be configured to loop around the driving pulley 414 of the first pulley assembly 406 such that a part of the belt interfaces with the two passive pulleys 416a, 416b in a manner that the belt 424 tightens and increases its contact surface with the driving pulley 414. The teeth on the surface of the belt 424 may engage with the teeth on the driving pulley 414.

In an embodiment, the tracking system 110 comprises a seasonal tilt wire assembly 450. The seasonal tilt wire assembly 450 comprises a first indexing member 452 and a second indexing member 454. The first indexing member 452 may be disposed such that its axis 453 is parallel to the axis 411 of the second shaft 410 of the tracking system 110 configured to track diurnal solar motion. The first indexing member 452 may define plurality of grooves 456 at regular intervals around its circumference. The first indexing member 452 may be engaged to a third shaft 458. The third shaft 458 may define external threads. A second worm gear 460 (refer FIG. 4C) may be provided such that the teeth on the third shaft 458 and the second worm gear 460 mutually engage. The second worm gear 460 may be coupled to a second pulley assembly 462. The third shaft 458 may be supported by two blocks 464a, 464b rigidly engaged to the support column 420.

Referring to FIG. 4B, the second pulley assembly 462 may be similar to first pulley assembly 406 comprising of a driving pulley 466 and two passive pulleys 468a, 468b disposed on opposite sides of the driving pulley 466. A belt 470 may be provided with two ends that may be connected to two rods 472a, 472b. The belt 470 may be looped around the driving pulley 466 such that a portion of the belt interfaces with the two passive pulleys 468a, 468b. Ends of seasonal tilt wire rope 302 may be connected to the two rods 472a, 472b forming a loop such that the seasonal tilt wire rope 302 loops around pulleys (not shown in figures) disposed within the first structures 304a, 304b (refer FIG. 3) of the second panel assembly 102*b* and the third panel assembly 102*c* that are rigidly engaged to the longitudinal structure 104.

Referring to FIG. 3, the seasonal tilt wire rope 302 interfaces with passive pulleys (not visible in figures) provided in the extension members 316*a*, 316*b* and 318*a*, 318*b* of the second panel assembly 102*b* and the third panel assembly 102*c* and interfacing with the semi-circular wedge members 320, 322 of the second structures 306*a*, 306*b* of the panel assemblies 102. The solar panel frames of the second structures 306*a*, 306*b* of the respective second panel assembly 102*b* and the third panel assembly 102*c* may be suspended from the respective diurnal tilt assemblies. It should be noted that while the rims of the semi-circular wedge members 216, 320 and 322 swing on the diurnal tilt axes during diurnal tracking, the line joining their centres of rotation coincides with the straight segments of the wire rope and remains fixed in space through both seasonal and diurnal tracking.

In yet another embodiment, seasonal tilt wire rope may comprise of a plurality of wire ropes. The wire ropes may be configured such that at least one wire rope connects second pulley assembly to at least one semi-circular wedge member of panel assemblies. The ends of plurality of semi-circular wedge members may be connected to each other with a different wire rope such that interface between a wire rope and the semi-circular wedge member is not necessitated.

In yet another embodiment the semi-circular wedge may be replaced by a radial arm and the wire rope segments connecting the semi-circular wedges maybe replaced by a rigid cam that pivots at the ends of the radial arm, such that the cam is able to transfer the seasonal tilt of one panel assembly to other panel assemblies.

Figure 5:
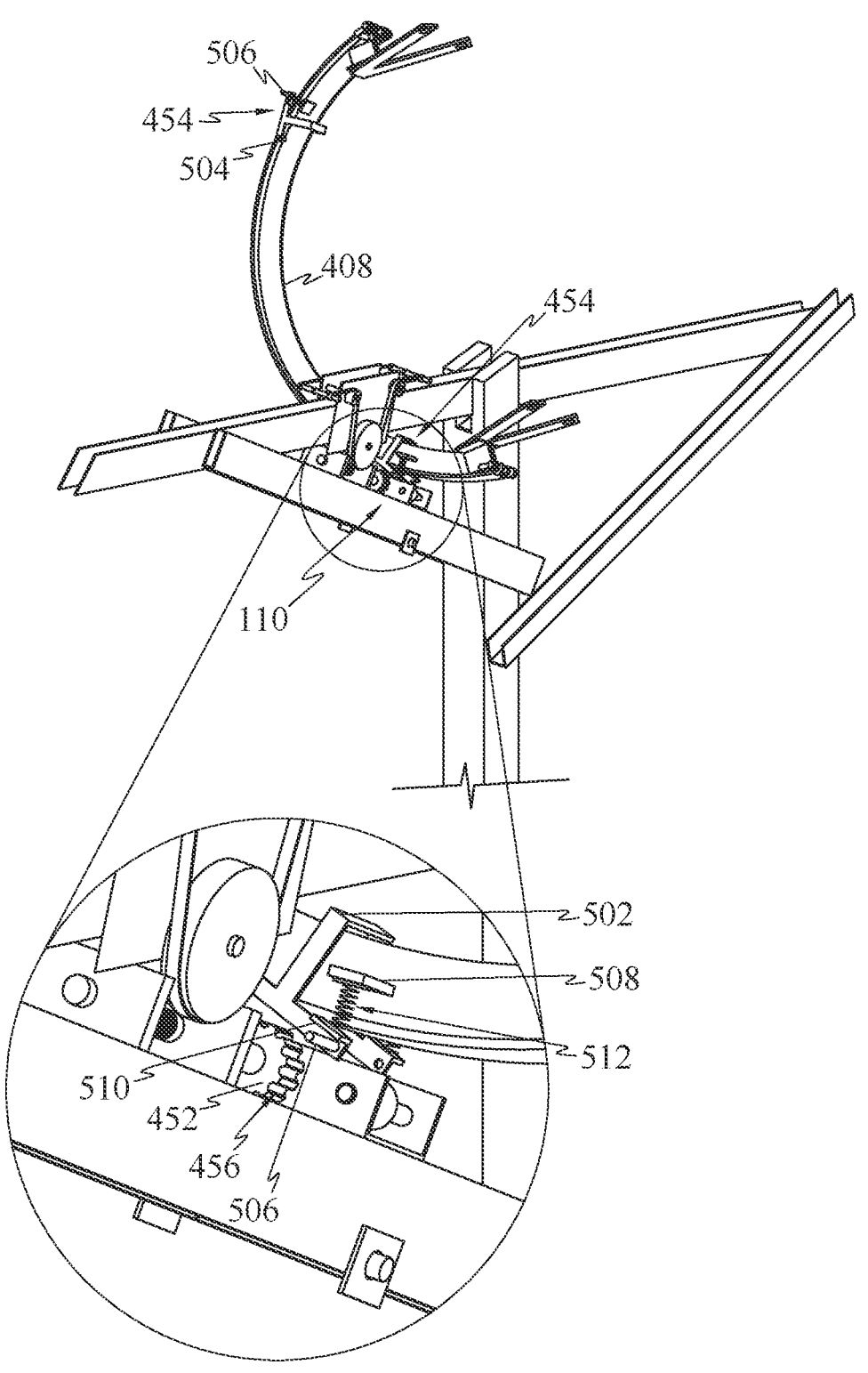
FIG. 5 illustrates a detailed view of the tracking system 110 depicting indexing members, in accordance with an embodiment.

In yet another embodiment, wherein a plurality of panel assemblies may be provided, wire ropes of a seasonal tilt wire rope may be configured such that at least one wire rope connects a second pulley assembly to a semi-circular wedge member Referring to FIG. 5, the tracking system 110 comprises second indexing member 454 disposed on either side of the semi-circular frame 408, in accordance with an embodiment. The second indexing member 454 comprises a right-angled frame 502 that may be pivotably engaged at a point 504 on the semi-circular frame 408. An extended member 506 may be provided on the right-angled frame 502 such that it extends away from the right-angled frame 502. Additional lateral surfaces 508, 510 may be provided, wherein the lateral surface 510 may be provided on the right-angled frame 502 and the lateral surface 508 may be provided on the semi-circular frame 408. A pair of springs 512 may be disposed between the lateral surfaces 508, 510 such that ends of the springs 512 are connected to the lateral surfaces 508, 510 provided on the semi-circular frame 408 and the right-angled frame 502. The extended member 506 may be configured to interface with the first indexing member 452 such that the extended member 506 is received by the grooves 456 defined by the first indexing member 452.

In yet another embodiment, the tracking system 110 comprises a motor, a motor shaft and a semi-circular frame configured to track diurnal solar motion. The motor shaft may define external threads enabling the motor shaft to act as a worm shaft. An outer surface of the semi-circular frame may define teeth along its circumference such that the motor shaft may be coupled to the semi-circular frame. The rotation of the motor shaft enables turning of the semi-circular frame in any particular direction. The semi-circular frame may be provided with limit switches and indexing members.

Figure 6:
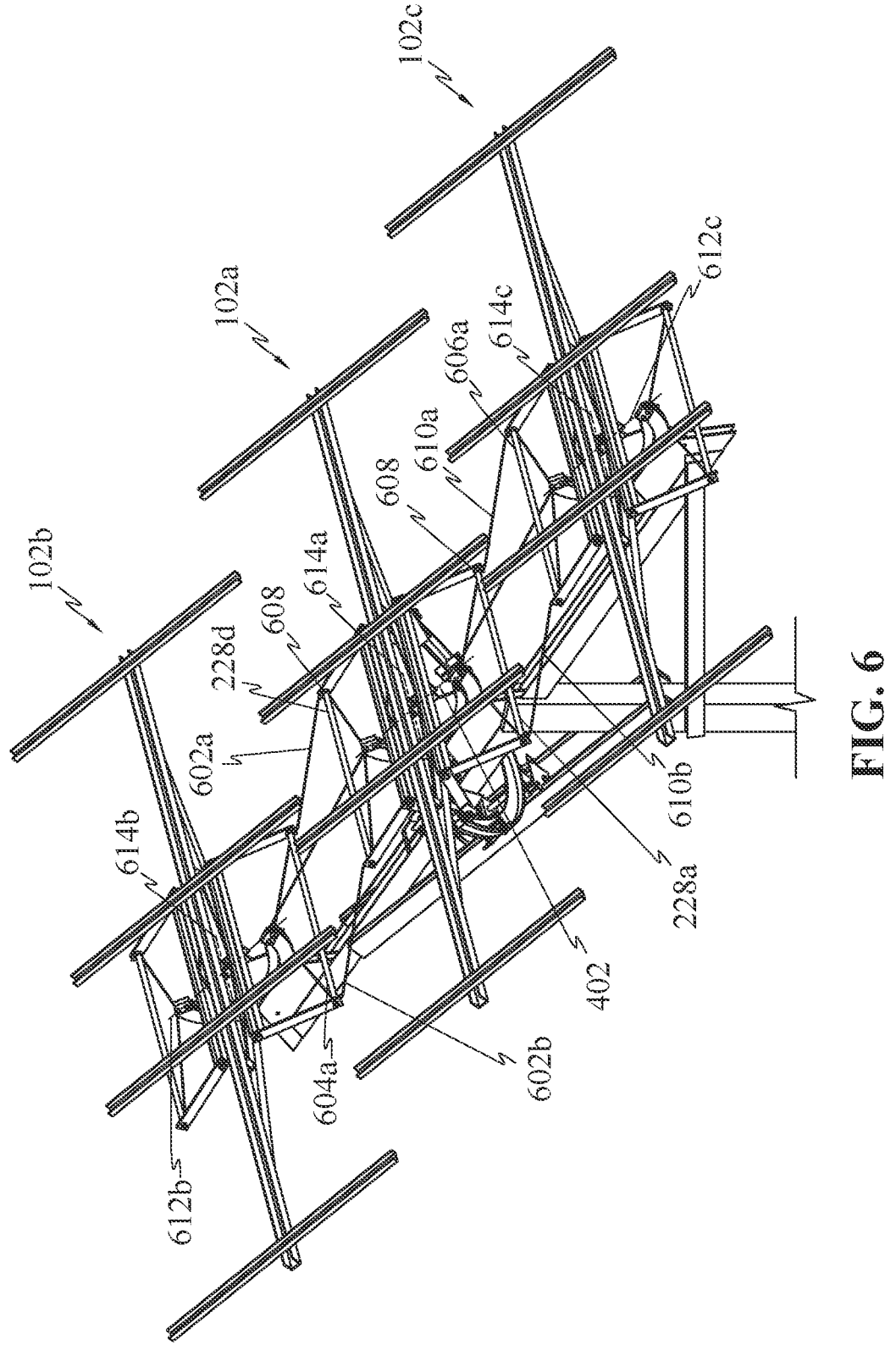
FIG. 6 illustrates the system 100 without the solar panels depicting the panel assemblies 102a, 102b, 102c being connected to each other, in accordance with an embodiment.

FIG. 6 illustrates a plurality of panel assemblies i.e., first panel assembly 102*a*, second panel assembly 102*b* and third panel assembly 102*c* being connected to each other via plurality of wires, in accordance with an embodiment. Lateral connecting members 228*a*, 228*d* of the first panel assembly 102*a*, lateral connecting member 604*a* of the second panel assembly 102*b* and lateral connecting member 606*a* of the third panel assembly 102*c* may be provided with dampers 608. The dampers 608 may comprise of a spring coupled to an energy absorber either in a series or in a parallel arrangement or a combination of both, wherein the spring and damper system is coupled to the lateral connecting members and the wire ropes, and the energy absorber is coupled to the spring to absorb the energy of oscillation in the structure. A first set of daily tilt transfer wire ropes 602*a*, 602*b* may be engaged to the dampers 608 disposed on the respective lateral connecting member, thereby connecting the first panel assembly 102*a* and the second panel assembly 102*b*. Similarly, a second set of daily tilt transfer wire ropes 610*a*, 610*b* may be employed to connect the first panel assembly 102*a* and the third panel assembly 102*c*.

In an embodiment, each of the panel assemblies i.e. the first panel assembly 102*a*, the second panel assembly 102*b* and the third panel assembly 102*c* may have independent tilt axes to track diurnal solar motion and seasonal solar motion. The first panel assembly 102*a* may be configured to track diurnal solar motion by tilting about a first daily tilt axis 402. Similarly, the second panel assembly 102*b* and the third panel assembly 102*c* may be configured to track diurnal solar motion by tilting about their respective second daily tilt axis 612*b* and third daily tilt axis 612*c*. The first daily tilt axis 402, second daily tilt axis 612*b* and the third daily tilt axis 612*c* may be parallel to each other and may be spaced apart.

In an embodiment, the first daily tilt axis 402, second daily tilt axis 612*b* and the third daily tilt axis 612*c* may be parallel to each other however may not be colinear to each other. The first daily tilt axis 402, second daily tilt axis 612*b* and the third daily tilt axis 612*c* may constitute a staggered arrangement instead of a collinear arrangement. The staggered arrangement of axes may permit a lower height of the column 106 as compared to a collinear arrangement of the axes, by ensuring that the panel assemblies 102*a*, 102*b*, 102*c* are not obstructed by the ground during a desired range of tracking motion even at a comparatively low column height.

In an embodiment, the first panel assembly 102*a* may be configured to track seasonal solar motion by tilting about a first seasonal tilt axis 614*a*. Similarly, the second panel assembly 102*b* and the third panel assembly 102*c* may be configured to track seasonal solar motion by tilting about their respective second seasonal tilt axis 614*b* and third seasonal tilt axis 614*c*. The first seasonal tilt axis 614*a*, second seasonal tilt axis 614*b* and the third seasonal tilt axis 614*c* may be parallel to each other and may be spaced apart.

In an embodiment the daily tilt axes of the panel assemblies 102*a*, 102*b*, 102*c* may be aligned to the earth's spin axis and the seasonal tilt axes of the panel assemblies 102*a*, 102*b*, 102*c* may be horizontal and may be aligned in East-West direction. This arrangement may constitute an equatorial tracking system.

In an embodiment, daily tilt transfer wire ropes 602*a*, 602*b* and 610*a*, 610*b* (refer FIG. 6) that transfer daily tilt from one panel assembly to the other with the dampers 608 and springs may perform the same function as conventional axial torque tubes that connect long rows of solar panels in horizontal single axis solar trackers that prevent unwanted rotary oscillations such as torsional galloping that can damage installations. Due to their placement at a large radial distance from the axis of daily tilt 402, 612b, 612c they transmit torque and dampen rotary motion at a large effective radius, which is a desirable feature in torque tubes. Moreover, the arrangement permits the placement of dampers between each panel assembly allowing them to be individually damped. It is not possible to achieve such a large effective radius in conventional axial torque tubes. This arrangement allows coupling of long rows of panels with the added benefit of accommodating axial tilts thereby increasing the energy output per photovoltaic panel due to better pointing accuracy.

Working

Diurnal Solar Motion

In an embodiment, the tracking system 110 may be configured to tilt the first panel assembly 102a to track diurnal solar motion. The motor may be configured to turn the motor shaft 404 in a particular direction. The rotation of the motor shaft 404 may cause the worm gear 412 to rotate as the teeth on the motor shaft 404 and the worm gear 412 are mutually engaged. The rotation in the worm gear 412 is transferred to the driving pulley 414 of the first pulley assembly 406 via the second shaft 410. The rotation of the driving pulley 414 causes the belt 424 looped around the driving pulley 414 to be pulled in the direction of rotation of the driving pulley 414. For example, the rotation of the driving pulley 414 in clockwise direction causes the belt 424 to be pulled from left to right thereby turning the semi-circular frame 408 in clockwise direction enabling the tilting of the first panel assembly 102a about its first daily tilt axis 402 and the rotation of the driving pulley 414 in anti-clockwise direction causes the belt 424 to be pulled from right to left thereby turning the semi-circular frame 408 in anti-clockwise direction enabling the tilting of the first panel assembly 102a about its first daily tilt axis 402.

In an embodiment, the first panel assembly 102a may be tilted such that the solar panels face east at sunrise. The motor may be pre-configured to rotate the motor shaft 404 at prefixed revolution(s) per hour such that the solar panels always face the sun at any given instance. The rotation of the motor shaft 404 may cause the semi-circular frame 408 to turn thereby causing the first panel assembly 102a to tilt from east to west along the first daily tilt axis 402.

In an embodiment, the tracking motion about the tilt axes may be uniform and regular or may follow the solar declination, without the need for any coordinate transformation from solar declination.

In an embodiment, the tilt in the first panel assembly 102a may be transferred to the second panel assembly 102b and the third panel assembly 102c via the pair of daily tilt transfer wire ropes 602a, 602b and 610a, 610b connecting the first panel assembly 102a to the second panel assembly 102b and the third panel assembly 102c. The daily tilt transfer wire ropes 602a, 602b and 610a, 610b may be connected to the respective lateral connecting members 228, 604, 606 via a pair of dampers. The dampers may be configured to dampen any sudden energy transfer.

In an embodiment, as the first panel assembly 102a tilts along the first daily axis 402 from east to west, the pair of daily tilt transfer wire ropes 602a, 602b and 610a, 610b connecting the lateral connecting member 604a of the first panel assembly 102a with the lateral connecting member 606a of the second 102b and the third panel assemblies 102c, may transfer the diurnal tilt from the first panel assembly 102a to the second 102b and the third panel assemblies 102c. The change in the tilt in the first panel assembly 102a may increase tension in the pair of daily tilt transfer wire ropes 602a, 602b and 610a, 610b. The change in the tension may cause the pair of daily tilt transfer wire ropes 602a, 602b and 610a, 610b to exert a downward pulling force on one arm and a lifting force on another arm among the pair of arms. The downward pulling force may be exerted over an arm towards the direction of the tilt and the lifting force may be exerted over an arm opposite to the arm towards the direction of tilt.

For example, when the first panel assembly 102a tilts along the first daily tilt axis 402 to track the diurnal solar motion from east to west, the daily tilt transfer wire ropes 602a connecting the lateral connecting member 228a, 228d of the first panel assembly 102a to the lateral connecting member 604a of the second panel assembly 102b and the daily tilt transfer wire rope 610a connecting the lateral connecting member 606a of the third panel assembly 102c on right side of the longitudinal structure 220 exert pulling force and the daily tilt transfer wire rope 602b connecting the lateral connecting members 228a, 228d of the first panel assembly 102a to the lateral connecting member 604a of the second panel assembly 102b and the daily tilt transfer wire rope 610b connecting the lateral connecting member 606a of the third panel assembly 102c on left side of the longitudinal structure 220 exert lifting force. The resultant of the downward pulling force and the lifting force causes the second 102b and the third panel assembly 102c to tilt in same direction as that of the first panel assembly 102a.

In an embodiment, at the end of each day the motor may be configured to rotate the motor shaft 404 in opposite direction such that the panel assemblies 102a, 1020b, 102c are returned to their initial position, i.e. the solar panels facing the direction of sunrise. The daily tilt transfer wire ropes 602a, 602b and 610a, 610b enable the second the third panel assembly to return to their initial position.

Figure 7A:
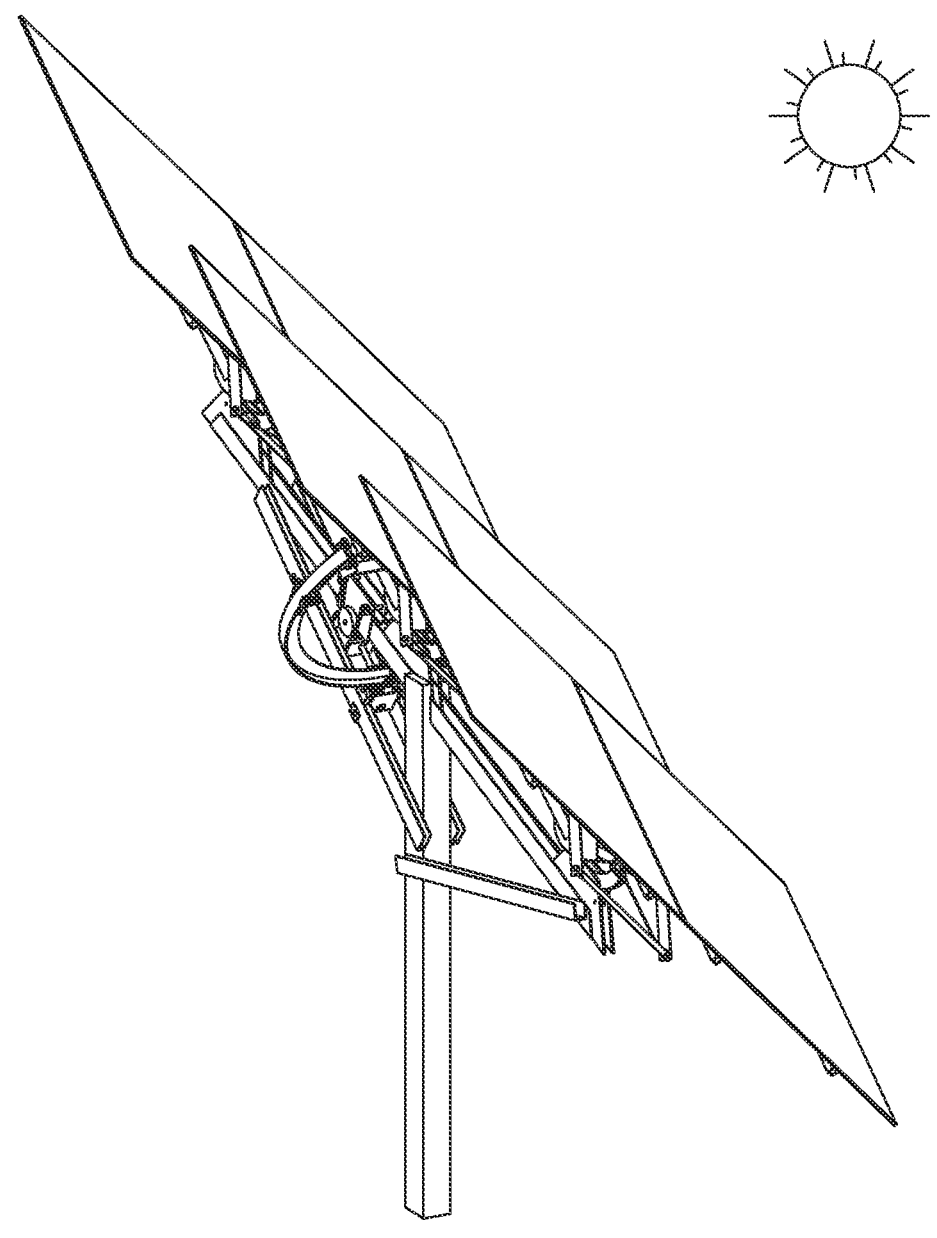
FIG. 7A illustrates solar panels tilted towards east depicting diurnal solar tracking, in accordance with an embodiment.
Figure 7B:
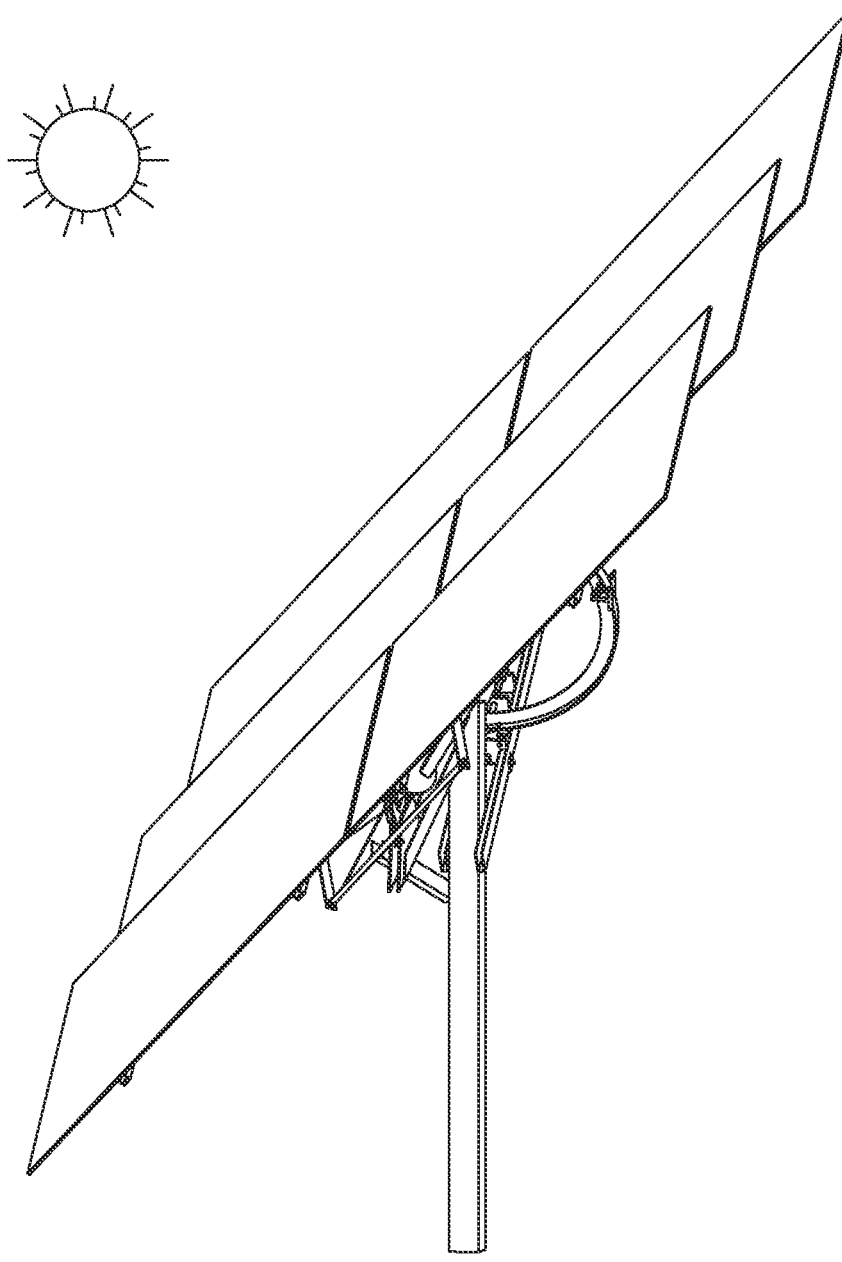
FIG. 7B illustrates solar panels tilted towards west depicting diurnal solar tracking, in accordance with an embodiment.

FIGS. 7A and 7B depicts two extreme positions of the panel assemblies 102a, 102b, 102c.

In an alternate embodiment, a pair of arms may be connected laterally via torsion tubes or lateral connecting members that may be provided with dampers. The torsion tube or the dampers provided on the lateral connecting members may be configured to absorb any sudden shock energy that may be generated as a result of torsional galloping in the panel assemblies due to higher wind speeds. The torsion tube or the damper may also be configured to dampen any excess any torque transferred from any connected subsequent panel assembly.

In an alternate embodiment, a rigid member may be employed to connect two lateral connecting members or torsion tubes connecting pairs of arms of subsequent panel assemblies. A pair of bearings may be provided to couple the rigid member to the lateral connecting member or the torsion tube.

Seasonal Solar Motion

In an embodiment, the seasonal tilt wire assembly 450 may be configured to tilt the panel assemblies 102a, 102b, 102c along their respective seasonal tilt axis. The motor may be pre-configured to provide additional tilts beyond the sunrise and sunset positions, to the semi-circular frame 408 through additional rotations of the motor shaft 404. These additional tilts may occur at set intervals of days, such that the indexing member (second indexing member 454) provided on the semi-circular frame 408 may interface with the first indexing member 452. The first indexing member 452 may be very minutely displaced by the extended member 506 provided on the second indexing member 454. The extended member 506 may be received by a groove 456 defined over circumference of the first indexing member 452 as the semi-circular frame 408 tilts along the first daily tilt axis 402 thereby slightly rotating the first indexing member 452. Once the motor completes the set rotations of the motor shaft 404 necessary for the diurnal solar tracking and the extra rotation needed for adjusting seasonal tilt, the motor rotates the motor shaft 404 in opposite direction such that the panel assemblies 102 are returned to their initial position facing the direction of sunrise. During this return motion of the panel assemblies 102, the springs 512 provided in the second indexing member 454 may be compressed as the extended member 506 interfaces with the first indexing member 452 such that the first indexing member 452 is not rotated backward. The employment of the springs 512 may allow the first indexing member 452 to be rotated in a single direction, thereby providing the necessary seasonal solar tracking along the seasonal tilt axis 614*a*. This arrangement permits the motor attached to shaft 404 to control both the diurnal tilt as well as the seasonal tilt of the panel assemblies 102.

In an embodiment, the rotation of the first indexing member 452 may be transferred to the second worm gear 460 via the third shaft 458. The driving pulley 466 of the second pulley assembly 462 rotates with the second worm gear 460. The semi-circular wedge member 216 may tilt along direction of the movement of the seasonal tilt wire rope 302 as the seasonal tilt wire rope 302 interfaces with the semi-circular wedge member 216.

Referring to FIGS. 8A and 8B, the rotation of the driving pulley 466 in a first rotation direction may cause the belt 470 to be pulled from right to left thereby causing the seasonal tilt wire rope 302 to tilt the panel assemblies 102 in first direction 802. Similarly, the rotation of the driving pulley 466 in a second rotation direction may cause the belt 470 to be pulled from left to right thereby causing the seasonal tilt wire rope 302 to tilt the panel assemblies 102 in second direction 804.

In an embodiment, the dual axis solar tracking system 100 may be configured to simultaneously track both diurnal and seasonal solar motion.

In an alternate embodiment the solar tracking system 100 may be configured to track only diurnal solar motion, wherein the diurnal tilt assembly and the seasonal tilt assembly along with its panels are one rigid piece and the seasonal tilt wire assembly is eliminated.

It shall be noted that the processes described above are described as sequence of steps; this was done solely for the sake of illustration. Accordingly, it is understood that some steps may be added, some steps may be omitted, the order of the steps may be re-arranged, or some steps may be performed simultaneously.

The processes described above is described as a sequence of steps. This was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A dual axis solar tracking system (100) comprising:

a base frame comprising vertical pole (106) and a longitudinal structure (104) extending laterally from the vertical pole (106);

a first panel assembly (102*a*) coupled to the longitudinal structure (104), the first panel assembly (102*a*) comprising a first solar panel; and a second panel assembly (102*b*) coupled to the longitudinal structure (104), the second panel assembly (102*b*) comprising a second solar panel, wherein, the first solar panel is configured to track diurnal solar motion by tilting about a first daily tilt axis (402);

the second solar panel is configured to track diurnal solar motion by tilting about a second daily tilt axis (612*b*); and the first daily tilt axis (402) and the second daily tilt axis (612*b*) are parallel to each other and spaced apart, wherein each of the first panel assembly (102*a*) and the second panel assembly (102*b*) comprises:

a first structure (202) rigidly coupled to the longitudinal structure (104); and a second structure (204), wherein the second structure (204) comprises four arms (226*a*, 226*b*, 226*c*, 226*d*) and connecting wires (230, 232), wherein four connecting wires (230, 232) connects the four arms to the first structure (202).

2. The system (100) as claimed in claim 1, wherein, the first solar panel is configured to track seasonal solar motion by tilting about a first seasonal tilt axis (614*a*);

the second solar panel is configured to track seasonal solar motion by tilting about a second seasonal tilt axis (614*b*); and the first seasonal tilt axis (614*a*) and the second seasonal tilt axis (614*b*) are parallel to each other and spaced apart.

3. The system (100) as claimed in claim 1, comprising:

a tracking system (110) to enable tracking diurnal solar motion, the tracking system (110) coupled with the first panel assembly (102*a*); and a pair of daily tilt transfer wire ropes (602*a*, 602*b*) connecting the first panel assembly (102*a*) and the second panel assembly (102*b*);

wherein, the tracking system (110) causes the first solar panel to tilt about the first daily tilt axis (402); and the pair of wire ropes (602*a*, 602*b*) transfers the tilt occurring about the first daily tilt axis (402) to the second panel assembly (102*b*) to tilt the second solar panel about the second daily tilt axis (612*b*).

4. The system (100) as claimed in claim 3, wherein the tracking system (110) comprises:

a motor; and a semi-circular frame (408) connected to the first panel assembly (102*a*);

wherein, the motor is coupled to the semi-circular frame (408), wherein the motor is configured to drive the semi-circular frame (408) to rotate the semi-circular frame (408); and

the rotating semi-circular frame (408) causes the first solar panel to tilt about the first daily tilt axis (402).

5. The system (100) as claimed in claim 4, wherein
the second structure (204) comprising a diurnal tilt assembly (225) and a solar panel frame (214), wherein,
the diurnal tilt assembly (225) is suspended from the first structure (202); and
the solar panel frame (214) is suspended from the diurnal tilt assembly (225).

6. The system (100) as claimed in claim 5, wherein,
the diurnal tilt assembly (225) is configured to tilt relative to the first structure (202);
and
the solar panel frame (214) is configured to tilt relative to the diurnal tilt assembly (225).

7. The system (100) as claimed in claim 6, wherein axis of tilt of the diurnal tilt assembly (225) intersect with axis of rotation of the solar panel frame (214) such that the two axes are perpendicular to each other.

8. The system (100) as claimed in claim 5, wherein the tracking system (110) enables tracking seasonal solar motion, wherein:
the tracking system (110) comprises a seasonal tilt wire assembly (450); and
the seasonal tilt wire assembly (450) pulls, by exerting force via wire (302), the first panel assembly (102*a*) causing the first solar panel to tilt about a first seasonal tilt axis (614*a*).

9. The system (100) as claimed in claim 8, wherein:
the seasonal tilt wire assembly (450) connects, via wire (302), the second structures (306*a*, 306*b*) of the first panel assembly (102*a*) and the second panel assembly (102*b*); and
the seasonal tilt wire assembly (450) transfers, via wire (302), the tilt occurring about
the first seasonal tilt axis (614*a*) to the second panel assembly (102*b*) to tilt the second solar panel about the second seasonal tilt axis (614*b***).

10. The system (100) as claimed in claim 9, wherein the tracking system (110) comprises:
a first indexing member (452) and a second indexing member (454) disposed on the semi-circular frame (408); and
a gear (460) coupled to the seasonal tilt wire assembly (450), wherein,
the first indexing member (452) interfaces with the gear (460) to rotate the gear (460) in a first rotation direction, wherein rotation of the gear (460) in the first rotation direction causes the seasonal tilt wire assembly (450) to pull in a first direction; and
the second indexing member (454) interfaces with the gear to rotate the gear in a second rotation direction, wherein rotation of the gear in the second rotation direction causes the seasonal tilt wire assembly (450) to pull in a second direction.

11. The system (100) as claimed in claim 8, wherein the seasonal tilt wire assembly (450) functions as a loop.

* * * * *